(12) United States Patent  
Thomas

(10) Patent No.: US 6,999,564 B1  
(45) Date of Patent: Feb. 14, 2006

(54) SYSTEM AND METHOD FOR TELEPHONIC SWITCHING AND SIGNALING BASED ON VOICE RECOGNITION

(75) Inventor: Andrew Thomas, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/113,696

(22) Filed: Mar. 29, 2002

(51) Int. Cl.  
*H04M 1/64* (2006.01)

(52) U.S. Cl. ............................. 379/88.03; 379/93.15; 455/563

(58) Field of Classification Search ............ 379/88.01, 379/88.02, 88.03, 88.04, 93.14, 93.15; 455/563  
See application file for complete search history.

(56) References Cited

U.S. PATENT DOCUMENTS

| | | | | |
|---|---|---|---|---|
| 5,881,134 A | * | 3/1999 | Foster et al. ............ | 379/88.01 |
| 6,144,723 A | * | 11/2000 | Truchon et al. .......... | 379/88.01 |
| 6,157,848 A | * | 12/2000 | Bareis et al. ............ | 379/88.03 |
| 6,229,880 B1 | * | 5/2001 | Reformato et al. ...... | 379/88.02 |
| 6,233,315 B1 | | 5/2001 | Reformato et al. | |
| 6,327,346 B1 | * | 12/2001 | Infosino .................. | 379/88.02 |
| 6,563,911 B1 | * | 5/2003 | Mahoney ................. | 379/88.03 |

OTHER PUBLICATIONS

Next-generation packet telephony networks: The evolution of voice switching and compression in ATM networks; Feb., 2001; White Paper 89004.25; Nortel Networks Corporation, USA.

Passport Packet Voice Gateway; Jul., 2000; Application Brief 89003.22; Nortel Networks Corporation, USA.

* cited by examiner

*Primary Examiner*—Fan Tsang  
*Assistant Examiner*—Gerald Gauthier  
(74) *Attorney, Agent, or Firm*—Haynes and Boone, LLP

(57) ABSTRACT

Accordingly, there is provided, a method of connecting users of a telecommunications system, the method comprising, receiving a call, playing a prompt in response to the call, receiving voice data, processing voice data to extract keyword information from the voice data, determining signaling information from the keyword data, and connecting the call based on the signaling information.

13 Claims, 4 Drawing Sheets

SYSTEM AND METHOD FOR TELEPHONIC SWITCHING AND SIGNALING BASED ON VOICE RECOGNITION

TECHNICAL FIELD

The invention relates in general to telecommunications systems, and in particular to telephonic switching based on a voice recognition interface.

BACKGROUND INFORMATION

Currently, when a land-base telephone user wishes to call someone, the user picks up the telephone handset and listens for a dial tone. At this point, the user is usually connected to a central office. A typical residential telephone typically communicates with a central office using two twisted wires. The central office is a facility where the telephone user's lines are joined to switching equipment for connecting with other telephone users. When a user lifts the handset (goes off hook) the electric current now flowing through the circuit is sensed by a line relay. This signals a switch in the central office to place the proper equipment on the line to send a dial tone, alerting the user that the switch is ready to receive the digits to be dialed.

After the user picks up the receiver and gets a dial tone, he or she may begin to push buttons on the keypad, identifying the destination of the call A combination of tones called DTMF (dual tone multi-frequency) is provided by the push buttons on a telephone. The DTMF tones are detected by a DTMF receiver which is connected to a computer-based switch in the central office. Based on the received DTMF signals, the computer-based switch can then determine the best route for the telephone call. It then sends a command to a switching matrix to establish the connection between the requesting line and the desired trunk to be used for transporting the call.

DTMF tones are useful not only to dial telephone numbers, but also to establish preferences and control other telephone services, such as call waiting, and call forwarding. However, many users forget which codes are used to control the various services. Users also forget phone numbers and must locate the correct number to dial. What is needed is a device and method which allows communication with the telephone user using voice recognition techniques, thereby allowing a user to dial a number simply by saying the person's name and city. Additionally, what is needed is a system or method that allows a user to set preferences for telephone services using voice commands, rather than DTMF codes.

SUMMARY OF THE INVENTION

The previously mentioned needs are fulfilled with the present invention. Accordingly, there is provided, a method of connecting users of a telecommunications system, the method comprising, receiving a call, playing a prompt in response to the call, receiving voice data, processing voice data to extract keyword information from the voice data, determining signaling information from the keyword data, and connecting the call based on the signaling information.

These and other features, and advantages, will be more clearly understood from the following detailed description taken in conjunction with the accompanying drawings. It is important to note the drawings are not intended to represent the only form of the invention.

DETAILED DESCRIPTION OF THE INVENTION

The present invention provides a unique method and system for performing phone dialing and related services by using a person's voice to communicate with the switching equipment. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
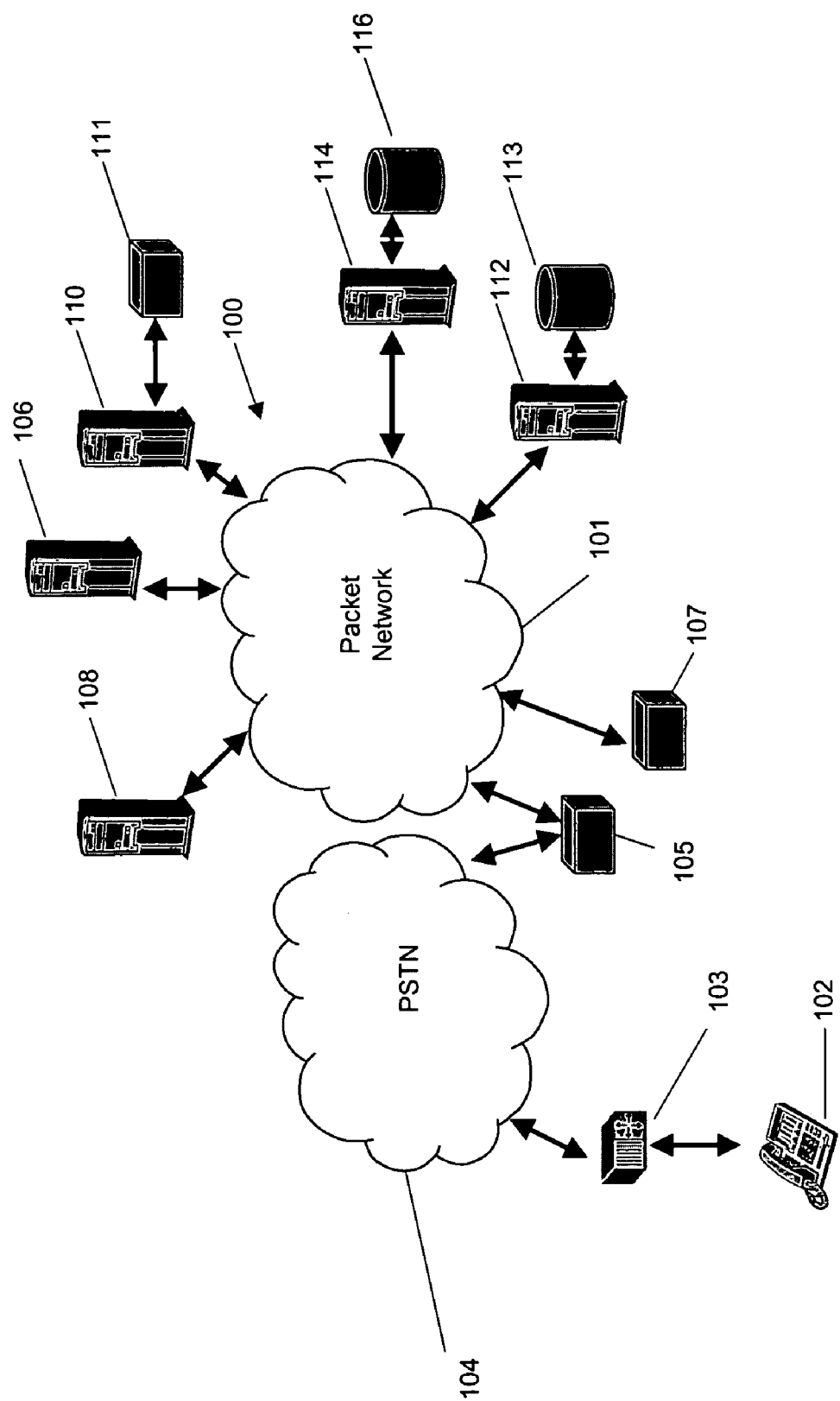
FIG. 1 is a functional diagram of a telecommunications system incorporating one aspect of the present invention.

Turning now to FIG. 1, there is an exemplary communications system 100 using one aspect of the present invention. The communications system 100 comprises a packet network 101, which can be any network capable of sending signals in the form of packets, such as a voice over IP network, which use either H.323 or Session Initiated Protocol "SIP" as a signaling protocol. In the illustrated embodiment, a telephone 102 is in communication with a central office switch 103 in a manner that is typically known in the art. The central office switch 103 is in communication with a public switched telephone network ("PSTN") 104 and can access a media gateway 105 which is also in communication with the PSTN 104. Alternatively, the telephone 102 could be a mobile unit in radio communication with a mobile network which is in communication with a PSTN.

The media gateway 105 provides access between networks that use different protocols. As viewed by the packet network 101, a media gateway is an endpoint or a collection of endpoints. Its primary role is to transform media from one transmission format to another. For instance, in this illustrative embodiment, the media gateway 105 transforms the incoming circuit signals to a packet format so that the signals can be routed within the packet network 101. One such media gateway currently known in the art is Passport PVG gateway, available from Nortel Networks of Richardson, Tex. In alternative embodiments, the central office switch 103 could be in communication with the media gateway 105 through the use of a direct link, such as a T1 line.

There may be several network components coupled to the packet network 101. For instance, there may be an IP telephone 107. The IP telephone 107 may be a dedicated network device that looks and acts like a conventional phone. However, such IP phones usually include a computer and dedicated digital signal processor ("DSP") coupled to a network connection, such as an Ethernet connection, so that voice data can be converted into packet data by the telephone. One such IP telephone is Nortel Network's i2004 Internet Telephone.

A soft-switch 106 is also connected to the packet network 101. The soft-switch 106 may be of a type of switch developed as a replacement for legacy central office switches used in PSTNs (such as central office switch 103). Such legacy switches are characterized as circuit switches because their logic is hard-coded to support voice grade telephone service on a circuit switch basis. In contrast, soft-switches are software based entities that offload call processing functions to industry-standard server hardware. Typically, a soft-switch separates call-control intelligence and services software from media hardware with open interfaces between the different application layers. For instance, call-control and signaling intelligence may reside within the soft-switch, while services intelligence is distributed among the soft-switch and application servers that reside at an upper layer in the network. The interface between the soft-switch and different types of media hardware is provided by various open protocols, such as Media Gateway Control Protocol (MGCP), H.248/Megaco and SIP. The interfaces between the soft-switch and application servers are also open and standards-based, and use protocols such as SIP and H.323, and tools like Extensible Markup Language (XML) and Java in advanced intelligent networks. One such soft-switch currently known in the art is the Succession CS-3000 Soft Switch, available from Nortel Networks of Richardson, Tex.

A media server 108 is also connected to the packet network 101. The media server 108 is a file server on a network that acts upon voice and image data. A media server operates as a slave to the soft-switch 106 which can invoke media processing on a particular channel of a gateway device. The soft-switch 106 may interface with the media server 108 using protocols such as MGCP, H.248, or SIP to direct the media server to provide necessary media interactions as part of delivering services. One such media server currently known in the art is the Universal Audio Server, available from Nortel Networks of Richardson, Tex.

Additionally, a feature server 110 is connected to the packet network 101. The feature server 110 tracks and is related to the features that work tightly as a call agent for a user using a registration database 111. In some embodiments, the feature server 110 may be built into the soft-switch 106. In other embodiments, the feature server 110 may be a separate server which provides call-associated capabilities such as call waiting, 3-way calling, speed dial, dial-by-presence, and other features that are applied to a call. One such feature server currently known in the art is the Interactive Multimedia Server, available from Nortel Networks of Richardson, Tex.

In this embodiment, there is also a dialog server 112. The dialog server 112 provides multi-function speech processing capabilities. The soft-switch 106 can deliver calls to the dialog server 112 using SIP or H.323. The dialog server 112 then takes over the call and may drive the media server 108 as needed to provide necessary media interactions as part of delivering services. In one embodiment, the dialog server 112 includes voice recognition or Advanced Speech Recognition ("ASR") components. The ASR system looks up recognized speech utterances in a database 113 to determine the number or service desired by the user. The utterances can be representations of common phrases, words or of portions of words (subwords). One such dialog server currently known in the art is the OSCAR Speech Processing Platform, available from Nortel Networks of Richardson, Tex.

An application server 114 is also in communication with the packet network 101. The application server 114 controls a phone directory database 116. The phone directory database 116 may include a database of names that are personal to the telephone user. The phone directory database 116 could also be the service provider's directory assistance database (e.g., a Telco database), the yellow pages, or some other database of registered names and phone numbers.

It is important to note that the components illustrated in FIG. 1 are exemplary. Other networks might use other units or components. Furthermore, such units may be either individual software components running on separate computers or on the same computer. Such components could also run on a general purpose computer or a special purpose computer designed for telecommunication networks and/or voice recognition.

Figure 2:
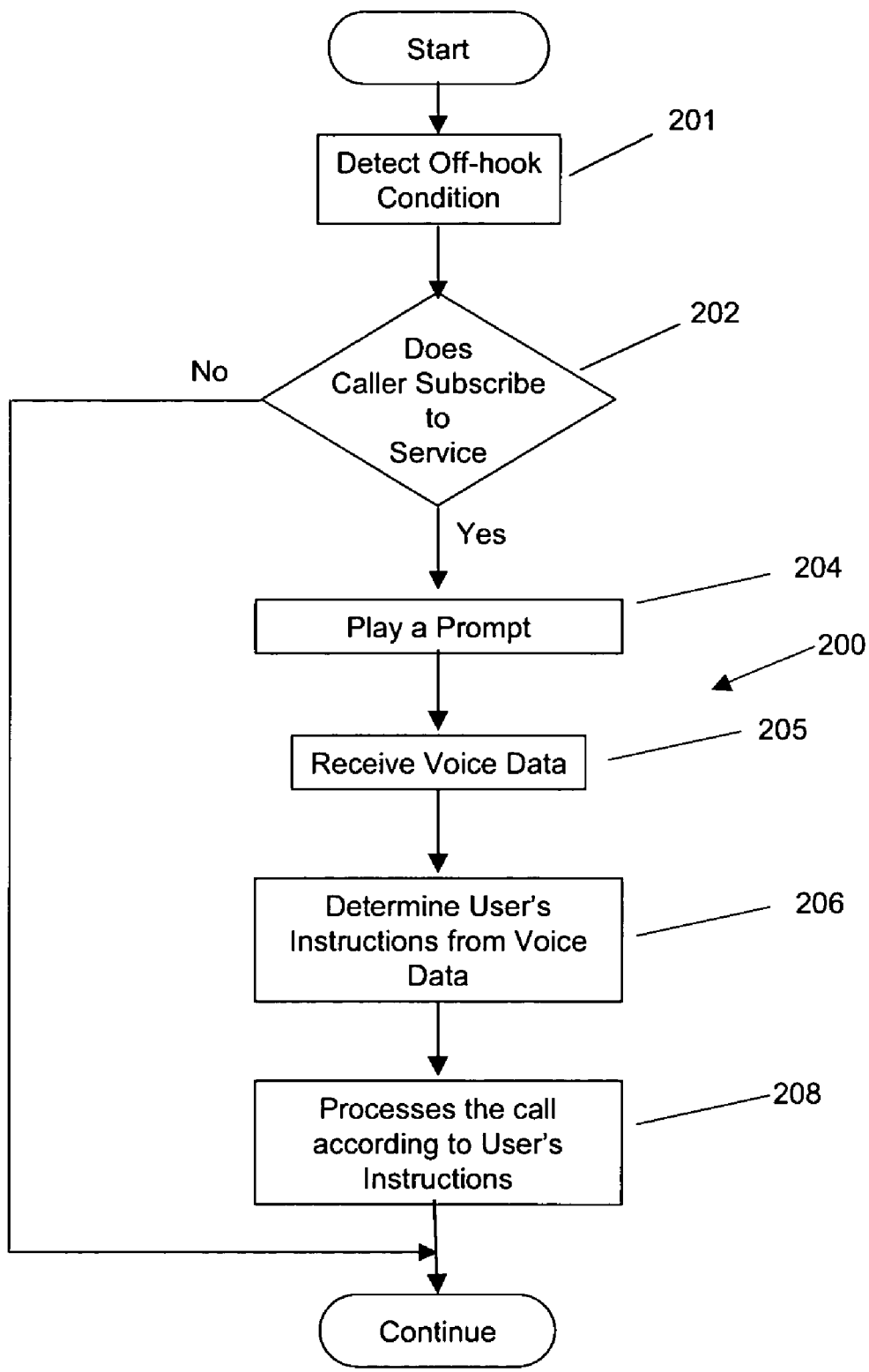
FIG. 2 is a flow diagram illustrating a method incorporating one aspect of the present invention.

Turning now to FIG. 2, there is illustrated one process 200 of using the system 100. A user of the telephone 102 picks up the phone's handset. This action causes an "off-hook condition" which is detected by the central office switch 103 (step 201). The central office switch then forwards the call to the media gateway 105. The media gateway sends a signal to the soft-switch 106. In contrast, when user of the IP telephone 107 picks up the handset, the computer in the IP telephone 107 detects the "off hook condition" and establishes a communications link directly with the soft-switch 106 through the packet network 101. For the purposes of this application, the term "off hook condition" includes any condition where a communication device attempts to access a communication network. Consequently, pressing the "send" button on a mobile phone is also an off hook condition. Thus, for purposes of this application, receiving a mobile origination message from a mobile phone could also be interpreted as receiving an "off-hook" signal.

Upon receiving the off-hook signal, the soft-switch 106 queries the feature server 110 to determine whether the telephone 102 is on a subscription plan that has subscribed to the appropriate voice feature (step 202). If the telephone 102 is not on a subscription plan, the soft-switch 106 waits for DTMF signals from the phone and switches the call in a conventional manner. On the other hand, if the phone is on an appropriate subscription plan, then the soft-switch 106 directs the media server 108 to play a prompt, which is then sent to the handset of the phone. The prompt could be any voice message, such as "Who would you like to call?" In other words, in response to the user causing an "off-hook" condition, a prompt is played through the handset of the telephone 102 (step 204).

As the user of the telephone 102 speaks, the user's acoustic signals are converted into electrical analog signals by the phone's microphone. The analog signals are sent to the media gateway 105, which converts the analog signals to digital signals, which represent the user's voice. The digital signals are routed to the dialog server 112. In contrast, when the user of the telephone 107 speaks, analog signals representing his voice are converted by the IP telephone's 105 DSP to digital signals, which can then be encapsulated into packets and sent to the dialog server 112.

When the dialog server 112 receives the digital signals containing the voice data (step 205), the dialog server 112 processes the voice data by comparing the voice data to a set of voice grammars contained in voice grammar database 113. When this comparison identifies a pre-registered voice grammar that is similar to the spoken words, a "match" is said to be found. If the dialog server 112 cannot match the voice signals, the dialog server 112 instructs the media server 108 to play additional prompts, such as "the system could did not understand, please speak again." The dialog server 112, then awaits for a new voice signal from the user. Once a match is found, the dialog server 112 can then determine the keywords which correspond to user's instructions (step 206). These keywords are sent to the feature server 110 for further processing. For instance, if the user says "call Jim Smith," the system knows that the user wishes to be connected to another telephone user named Jim Smith. In a similar manner, the user could also activate or deactivate other telephony services, such as call forwarding or voice mail.

As previously stated, once the dialog server 112 determines the meaning of the user's instructions, the dialog server passes this information to the feature server 110. In step 208, the feature server 110 processes the information according to the user's instructions. For instance, if the user says "voice mail messages" and the feature server would know that the user wishes to retrieve his voice mail messages and could instruct a voice mail application server (not shown) to retrieve the users' voice mail messages. On the other hand, if the user wishes to call Jim Smith, the feature server 110 can query the application server 114, which is coupled to the directory database 116 for Jim Smith's phone number. Once Jim Smith's phone number has been retrieved from the directory database 116, the feature server 1110 can pass the phone number to the soft-switch 106. The soft-switch 106 can then connect the telephone 102 to the destination phone in a manner known in the art.

Figure 3:
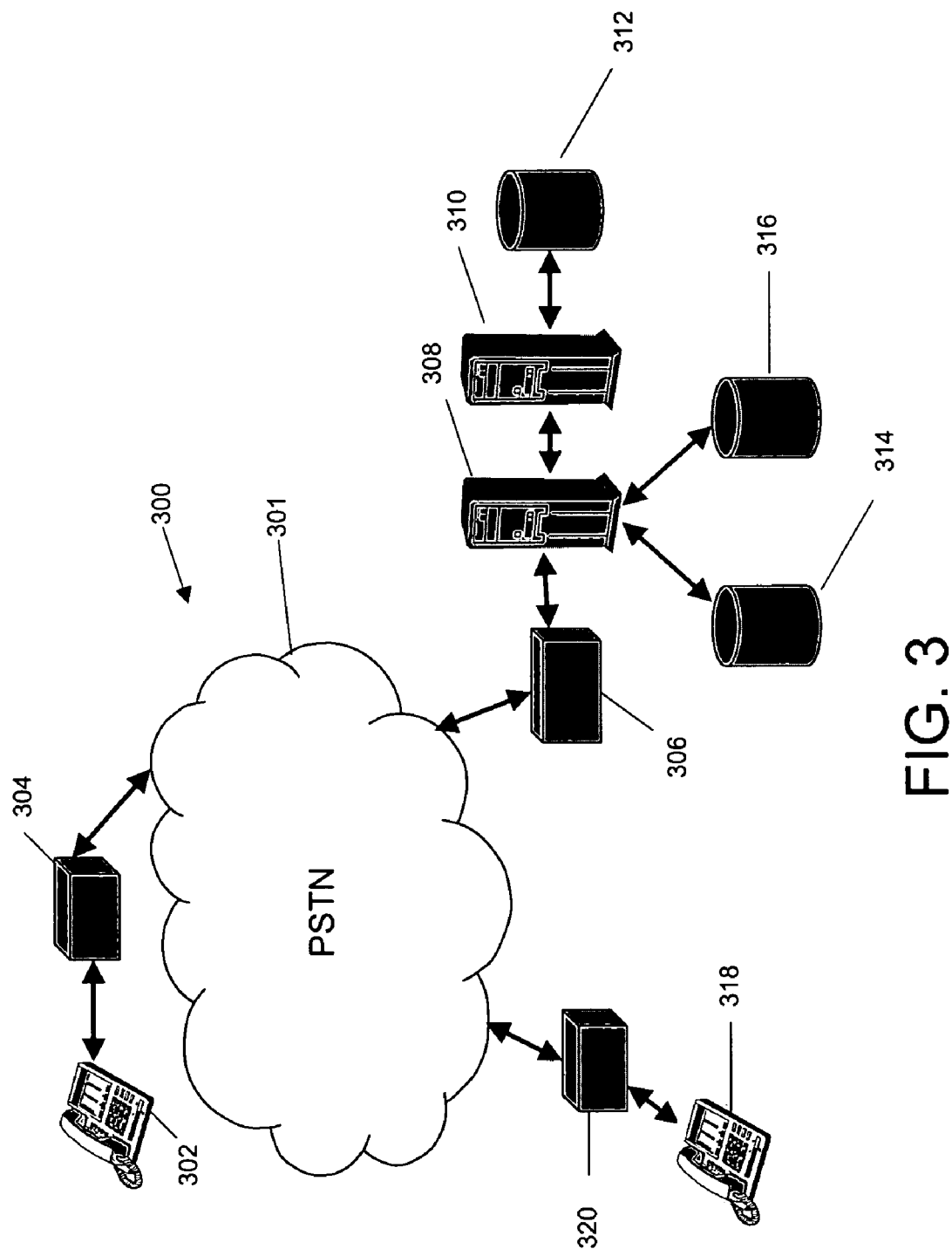
FIG. 3 is a functional diagram of a telecommunications system incorporating an alternative aspect of the present invention.

The process 200 is equally applicable in a legacy environment. Turning now to FIG. 3, there is an exemplary communications system 300 primarily operating in a legacy environment. The communications system 300 comprises a PSTN network 301. In the illustrated embodiment, a telephone 302 is in communication with a central office switch 304 in a manner that is typically known in the art. The central office switch 304 is coupled to the PSTN network 301. In one embodiment, the central office switch 304 can connect a call originating from the telephone 302 to a network access node 306 via the PSTN network 301. Alternatively, the central office switch 304 may be coupled to the network access node 306 by means of direct link, such as a T1 line.

The network node 306 may be node capable of translating circuit signals to a digital format and vice versa. In this embodiment, the network node 306 is an intelligent peripheral integrated with a media gateway. Thus, the network node 306 transforms the incoming circuit signals to a digital format. The digital signals are then processed by an interactive voice response ("IVR") system 308, which is in communication with the network node 306. As known in the art, a typical IVR is a computer that responds to users by playing snippets of recordings of human voice (or a synthesized voice). Users typically interact with an IVR by entering DTMF tones in response to voice menus.

In the illustrative embodiment, the IVR system 308 is in communication with a speech processing system 310. The speech processing system 310 also includes voice recognition or ASR components. The ASR system uses a voice grammar database 312 to store composite voice grammars that represent portions of words spoken by one or more individuals. These voice grammars can be representative of common phrases, words or of portions of words (subwords). One such dialog server currently known in the art is the OSCAR Speech Processing Platform, available from Nortel Networks of Richardson, Tex.

Also coupled to the IVR system 308 is a voice recording database 314. The voice recording database 314 comprises pre-recording voice recordings which can be used as prompts during interaction with the user. Additionally, there is a phone directory database 316, such as a Telco database, in communication with the IVR system 308. The directory database 316 contains a directory of most telephone company customers and their phone numbers. Numerous other telephones, such as telephone 318, may connect to the PSTN network through other central office switches, such as central office switch 320.

It is important to note that the components illustrated in FIG. 3 are exemplary. Other networks might use other units or components. Furthermore, such units may be either individual software components running on separate computers or on the same computer. Such components could also run on a general purpose computer or a special purpose computer designed for telecommunication networks and/or voice recognition.

In operation, the system 300 may be used in a manner similar to the process 200 of FIG. 2. Turning back to FIG. 2 while also referring to FIG. 3, a user of the telephone 302 picks up the phone's handset. This action causes an "off-hook" condition which is detected by the central office switch 304 (step 201). Upon receiving the off-hook signal, the central office switch queries the IVR system 308 to determine whether the telephone 302 is on a subscription plan that has subscribed to the appropriate voice feature (step 202). The IVR system 308, in turn, queries its directory database 316 to determine if the telephone 302 is on an appropriate subscription plan. If the telephone 302 is on an appropriate plan, the call is connected to the IVR system 308 via the network access node 306. If the phone is not on the appropriate plan, the central office switch is directed to accept DTMF tones and switches the call to its destination in an manner known in the art.

Once the call is connected to the IVR system 308, the IVR system 308 plays a prompt from its voice recording database 314, which is then sent to the handset of the phone. The prompt could be any voice message, such as "Who would you like to call?" In other words, in response to the user causing an "off-hook" condition, a prompt is played through the handset of the telephone 102 (step 204). As the user of the telephone 102 speaks, the user's acoustic signals are converted into electrical analog signals by the phone's microphone. The analog signals are sent through the PSTN to the network access node 306, which converts the analog signals to digital signals. The digital signals are sent to the speech processing system 310 via the IVR system 308 (step 205). When the speech processing system 310 receives a voice signal, the speech processing system 310 compares the voice signal to a set of voice grammars contained in voice grammar database 312. When this comparison identifies a pre-registered voice grammar that is similar to the spoken words, a "match" is said to be found. If the speech processing system 310 cannot match the voice signals, the speech processing system 310 instructs the IVR system 308 to play additional prompts, such as "the system did not understand, please speak again." The speech processing system 310, then awaits for a new voice signal from the user. Once a match is found, the speech processing system 310 can then determine the key words that form the user's instructions (step 206). For instance, the dialog server may determine the name of the person that the user wishes to contact. This name is sent to the IVR system 308 for further processing.

After the IVR system 308 determines the meaning of the user's instructions or the name of the called person, the IVR system 308 accesses the directory database 316 and determines the appropriate number, which for purposes of this example, is assumed to be the telephone 318. Once the phone number for telephone 318 has been retrieved from the directory database 316, the IVR system 308 can request the central office switch 304 to redirect the call to the phone number retrieved. The central office switch 304 can then connect the user to the telephone 318 in a manner known in the art.

It is important to note that the user can access the speech switching system from any phone in the network that provides the service. Thus, the user does not have to use his home telephone. For instance, if a registered user were making a call from a pay phone, one of the registered key words might be "Login" which would prompt a login or verification process. After completion of the verification process, the user would have access to his voice dialing services.

Figure 4:
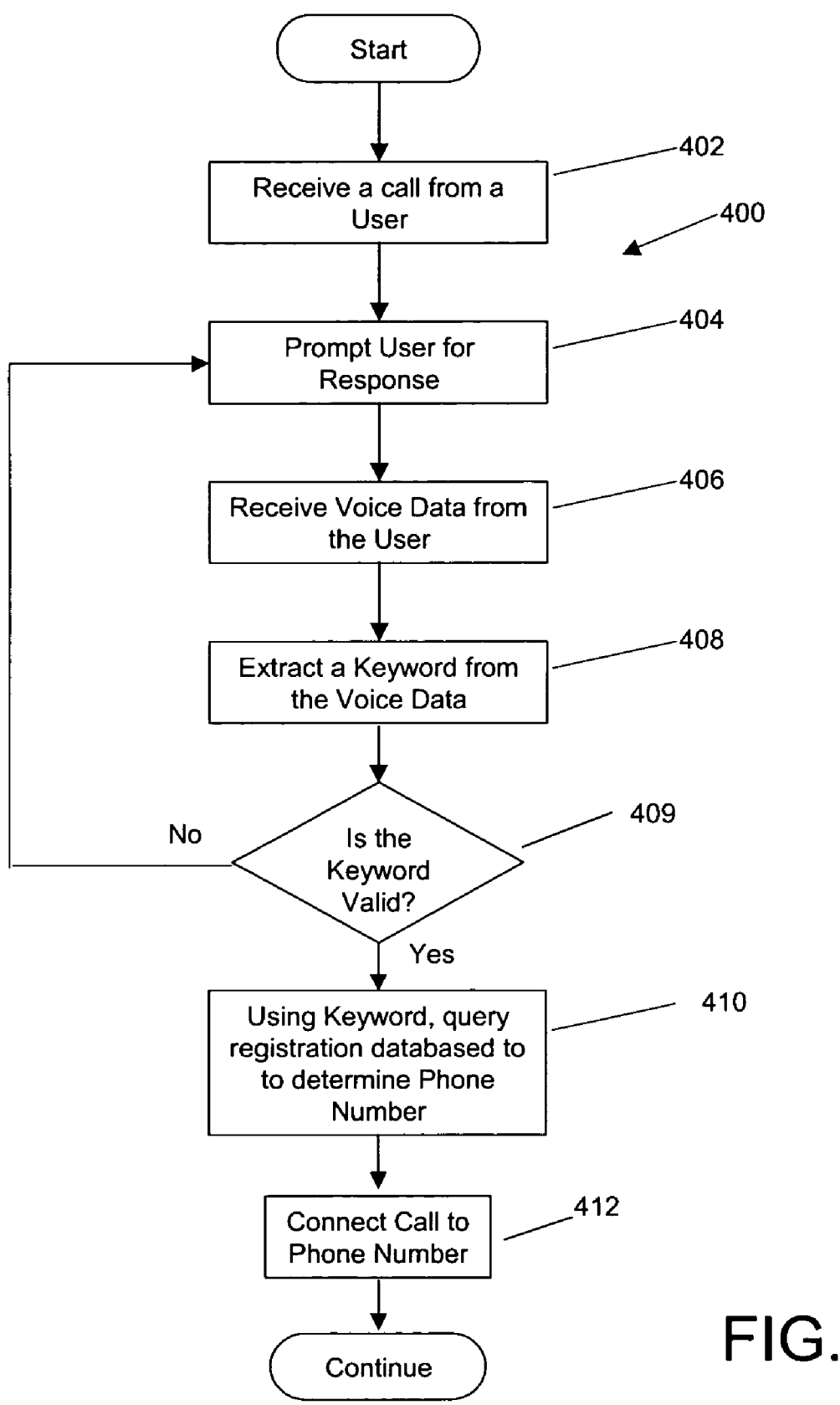
FIG. 4 is a flow diagram illustrating a method incorporating one aspect of the present invention.

Turning now to FIG. 4, one process 400 for implementing the system of this disclosure is described. At step 402 a call is received from a user. At step 404, the user is prompted for a response. At step 406, voice data is received from the user. At step 408, a keyword is extracted from the voice data. At step 409, a determination is made as to whether the keyword is valid. If it is not, steps 404, 406, 408, and 409 may be repeated. If the keyword is valid, at step 410, a registration database is queried to determine a phone number. At step 412, the call is connected to the phone number.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A method of switching a call in a telecommunications system, the method comprising,
   detecting an off-hook condition for a telephone,
   determining whether the telephone is associated with a required subscription feature,
      if not then connecting the call in a conventional manner;
      if so then,
         without detecting a dialed key, playing a prompt in response to the detection of the off-hook condition in order to acquire voice data,
         receiving the voice data,
         processing the voice data to extract keyword information from the voice data,
         determining signaling information from the keyword data,
         connecting the call based on the signaling information,
         converting the voice data to digital data,
         encapsulating the digital data into a packet format, and
         routing the digital data to a dialog server, wherein the dialog server is in communication with a packet network.

2. The method of claim 1 wherein the processing further comprises:
   comparing the voice data to a set of voice grammars in order to match the voice data to a voice grammar, and
   determining keywords from the match.

3. The method of claim 2 further comprising:
   determining a destination from the keywords,
   retrieving a phone number associated with the destination and,
   routing the call to the destination using with the phone number.

4. The method of claim 2 further comprising:
   determining option settings from the keywords,
   setting subscriber options based on the option settings.

5. A network node in a telecommunications system, the node comprising:
   a computer processor in communication with the telecommunications system,
   a storage device coupled to the computer processor, wherein the storage device includes instructions for:
   monitoring for an off-hook condition signal,
   determining whether a telephone is associated with a subscription feature, if not then connecting the call in a conventional manner, and if so then without detecting a dialed key, playing a prompt in response to receipt of the off-hook condition signal,
   receiving voice data,
   processing the voice data to extract keyword data from the voice data,
   determining signaling information from the keyword data,
   routing a call using the signaling information,
   converting the voice data to digital data,
   encapsulating the digital data into a packet format, and
   routing the digital data to a dialog server, wherein the dialog server is in communication with a packet network.

6. The network node of claim 5 wherein the storage device further includes instructions for:
   comparing the voice data to a set of voice grammars in order to match for the voice data to a voice grammar, and
   determining keywords from the match.

7. The network node of claim 6 wherein the storage device further includes instructions for:
   determining a destination from the keywords,
   retrieving a phone number associated with the destination,
   routing the call to the destination using the phone number.

8. The network node of claim 5 wherein the storage device further includes instructions for:
   determining option settings from the keywords, and
   setting subscriber options based on the option settings.

9. A signaling system for a communications network, comprising:
   a media gateway in communication with the communications network, the media gateway adapted to receive telephone signals,
   a media server in communication with the communications network, the media server adapted to play audio prompts, wherein the media server is adapted to provide a first audio prompt upon receipt of an off-hook condition and without the detection of a dialed key,
   a dialog server in communication with the communications network, the dialog server adapted for determining the content of voice data,
   a feature server in communication with the communications network, the feature server adapted to determining signaling information from the content of the voice data,
   a soft-switch in communication with the telecommunications network, the soft-switch adapted to perform switching functions based on the signaling information, wherein either the media server, the dialog server, or the feature server is adapted for determining whether a telephone is associated with a subscription feature, if not then provides instructions for connecting the call in a conventional manner, and an application server in communication with the communications network and coupled to a directory database, wherein the directory database includes at least one mapping between a name and a phone number such that if the content of the voice data is the name, the application server can extract the phone number from the directory database.

10. A signaling system for a communications network, comprising:

a media gateway in communication with the communications network, the media gateway adapted to receive telephone signals, a media server in communication with the communications network, the media server adapted to play audio prompts, wherein the media server is adapted to provide a first audio prompt upon receipt of an off-hook condition and without the detection of a dialed key, a dialog server in communication with the communications network, the dialog server adapted for determining the content of voice data, a feature server in communication with the communications network, the feature server adapted to determining signaling information from the content of the voice data, a soft-switch in communication with the telecommunications network, the soft-switch adapted to perform switching functions based on the signaling information, wherein either the media server, the dialog server, or the feature server is adapted for determining whether a telephone is associated with a subscription feature, if not then provides instructions for connecting the call in a conventional manner, and an application server in communication with the communications network and coupled to a personal database, wherein the personal database includes mappings between user definable keywords and phone numbers such that if the content of the voice data is a name, the application server can extract a phone number from the directory database.

11. A signaling system for a communications network, comprising:

a media gateway in communication with the communications network, the media gateway adapted to receive telephone signals, a media server in communication with the communications network, the media server adapted to play audio prompts, wherein the media server is adapted to provide a first audio prompt upon receipt of an off-hook condition and without the detection of a dialed key, a dialog server in communication with the communications network, the dialog server adapted for determining the content of voice data, a feature server in communication with the communications network, the feature server adapted to determining signaling information from the content of the voice data, a soft-switch in communication with the telecommunications network, the soft-switch adapted to perform switching functions based on the signaling information, wherein either the media server, the dialog server, or the feature server is adapted for determining whether a telephone is associated with a subscription feature, if not then provides instructions for connecting the call in a conventional manner, and a registration database coupled to the feature server, such that the feature server can determine which features are associated with a particular phone.

12. A network device for a communications network, comprising:

a network access node adapted to be in communication with the communications network, the network access node adapted to receive signals from a telephone;

an application server coupled to the network access node, the application server adapted for responding to the signals from the telephone, wherein the application server is adapted to determine whether the telephone is associated with a subscription feature, if not then providing instructions for connecting a call in a conventional manner, and if so then the application server is adapted to provide a prompt upon receipt of an off-hook condition at the telephone and without the detection of a dialed key;

a speech recognition system coupled to the application server, the speech recognition system adapted for determining the content of voice data with the signals and sending the content to the application server so that the application server can determine signaling information from the content; and a directory database in communication with the application server, wherein the directory database includes at least one mapping between a name and a phone number such that if the content of the voice data is the name, the application server can extract the phone number from the directory database.

13. The network device of claim 12 wherein the directory database is a personal directory database containing a mapping of user definable keywords.

* * * * *